Sept. 29, 1970 F. W. SEIBOLD 3,531,722
FREQUENCY MONITORING SYSTEM EMPLOYING A LOCAL
OSCILLATOR AND FIXED-TUNED MONITOR
Filed Aug. 11, 1967
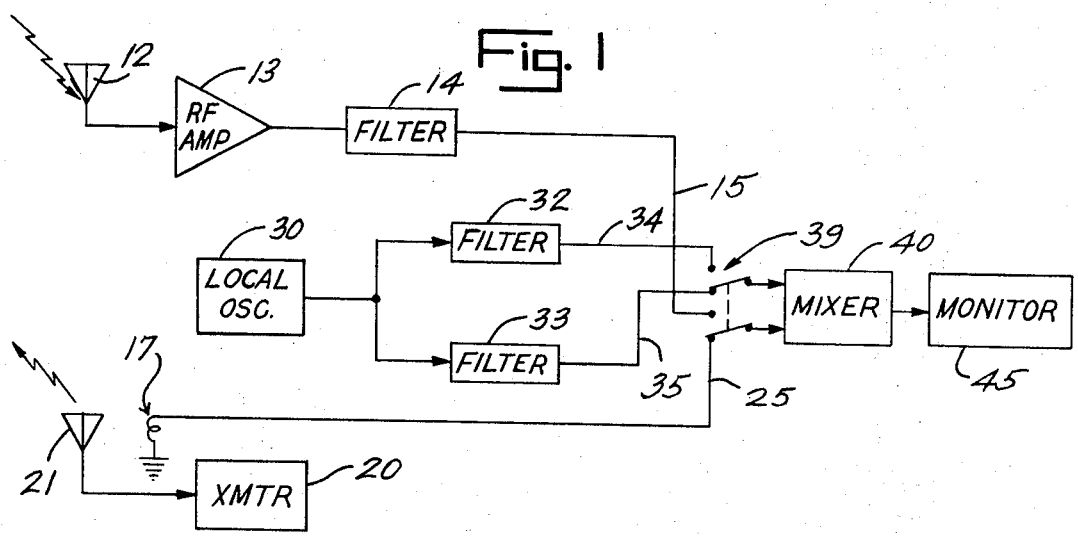
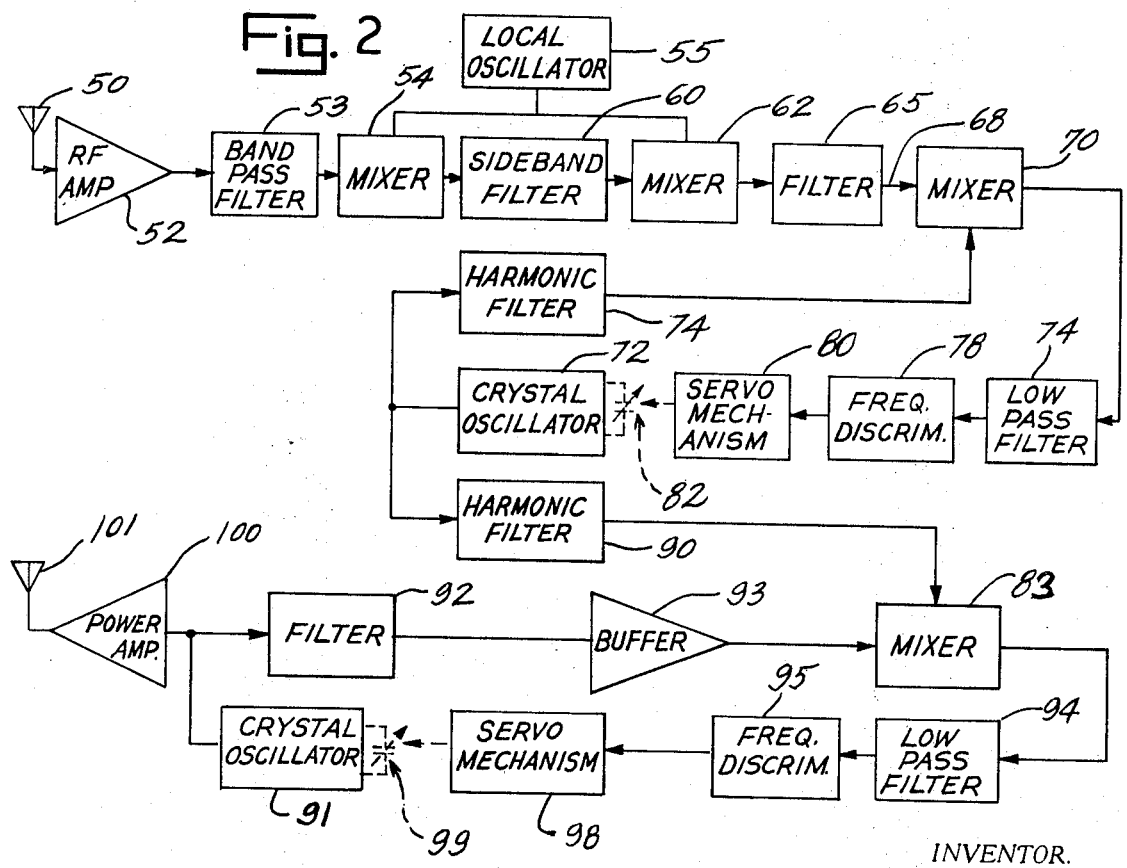
INVENTOR.
FREDERICK W. SEIBOLD
BY Bair, Freeman & Molinare
ATTORNEYS

United States Patent Office 3,531,722
Patented Sept. 29, 1970

3,531,722
FREQUENCY MONITORING SYSTEM EMPLOYING A LOCAL OSCILLATOR AND FIXED-TUNED MONITOR
Frederick W. Seibold, 600 S. Main St.,
Tuscola, Ill. 61953
Filed Aug. 11, 1967, Ser. No. 660,050
Int. Cl. G01r *23/14;* H03b *3/04;* H04b *3/46*
U.S. Cl. 325—134                                            6 Claims

ABSTRACT OF THE DISCLOSURE

An arrangement for monitoring the operating frequency of a radio transmitter. The arrangement employs a source of a primary reference signal having a predetermined frequency in conjunction with a local oscillator capable of generating harmonic signals. The fundamental operating frequency of the local oscillator is selected such that the frequency of one of its harmonics falls near the reference frequency while a second, different harmonic frequency falls near the operating frequency of the transmitter. By comparing the fixed reference frequency with one harmonic, any change in the frequency of the signal produced by local oscillator may be accurately detected. Hence, by comparing the operating frequency of the transmitter with the local oscillator's other harmonic, any deviation in the transmitting frequency may also be accurately monitored.

BACKGROUND OF THE INVENTION

This invention relates to electrical measurement apparatus and, more particularly, to an arrangement for continuously and accurately monitoring the frequency of a radio signal.

Both by international treaties and by domestic governmental regulations, radio and television broadcasters are required to operate on (or very near to) pre-assigned transmitting frequencies. For example, each conventional AM broadcast station is required to maintain its transmitted carrier frequency within twenty cycles of the station's pre-assigned frequency.

Frequency deviation measuring equipment has been developed to assist the broadcaster in maintaining assigned carrier (and subcarrier) frequencies. The monitors normally include an arrangement for intermodulating the transmitted signal (whose frequency is to be monitored) with a locally generated secondary reference signal in order to produce a low (audio) frequency heterodyne product. Deviations in transmitting frequency are manifested as equal deviations in the low frequency signal (provided that the frequency of the reference signal remains constant). A frequency discriminator connected to the output of the intermodulating device may then be employed to produce a D.C. output signal whose magnitude varies in proportion to frequency deviations. A meter measuring this D.C. signal thus provides a direct indication of any departure from the desired transmitting frequency.

Although these prior monitoring arrangements have proven to be normally effective, they are not without disadvantages. The accuracy of such a monitor is totally dependent upon the stability and precision with which the secondary reference signal may be generated. The oscillators required to generate such an accurate reference signal are relatively complex and expensive. Moreover, any devitation in the reference frequency (caused, for example, by aging of components may remain undetected until the system is again calibrated against a primary frequency standard signal (such as the signal broadcast by National Bureau of Standards Stations WWV and WWVH).

SUMMARY OF THE INVENTION

In a principal aspect, the present invention takes the form of an improved arangement for continuously monitoring the operating frequency of a radio transmitter. The arrangement contemplated by the invention employs a source of a primary reference signal, this source preferably taking the form of a radio receiver tuned to receive and amplify signals transmitted from a frequency standard station (such as WWV or WWVH). The arrangement also includes a local oscillator for producing a fundamental output signal having a predetermined frequency as well as harmonic signals at integral multiples of the fundamental frequency. A first filter connected to the output of the oscillator isolates a selected one of these harmonic signals, this selected harmonic having a frequency which is near to the frequency of the primary reference signal. A second filter isolates a different harmonic signal produced by the oscillator, this other harmonic having a frequency which is near the operating frequency of the transmitter. The reference signal is mixed (intermodulated) with its nearby harmonic signal to produce a first heterodyne product having a relatively low frequency. The signal from the transmitter is also intermodulated with the other selected harmonic signal to produce a second, low frequency heterodyne product. Means are then employed for detecting variations in the frequency of the first heterodyne product such that any drift in local oscillator frequency may be detected. With the integrity of the local oscillator frequency thus established, means are employed for detecting frequency variations in the second heterodyne product in order to permit highly accurate detection and measurement of any drift in frequency of the radio transmitter.

BRIEF DESCRIPTION OF THE DRAWINGS

The principles of the invention may be more clearly understood by considering the following detailed description of two specific embodiments of the invention. In the course of this description, reference will frequently be made to the attached drawings in which:

FIG. 1 is a block diagram of a first frequency monitoring system employing the principles of the invention; and FIG. 2 is a block diagram of a more elaborate monitoring system also embodying the principles of the present invention.

DESCRIPTION OF THE PREFERRED EMBODIMENTS

A simple yet highly accurate frequency monitoring arrangement is shown in FIG. 1 of the drawings. The system includes an antenna 12 for receiving the transmission of a frequency standard station such as WWV (in Boulder, Colo.) or WWVH (in Puunene, Hawaii), operated by the National Bureau of Standards. Both stations transmit continuously at 2.5, 5, 10, 15 and 25 megahertz at frequencies accurate within two parts in one hundred million. The signal picked up by antenna 12 is amplified by a radio frequency amplifier 13 and separated from other signals by means of a band-pass filter 14. The combination of antenna 12, amplifier 13, and filter 14 thus provide a source of a primary frequency standard signal which appears at output conductor 15.

A simple link-coupling coil indicated at 17, which is placed in the vicinity of transmitter 20 or transmitting antenna 21, provides a low-level signal (corresponding to the transmitted signal) to conductor 25.

The arrangement shown in FIG. 1 also employs a local oscillator 30, which may take the form of a conventional crystal-controlled oscillator capable of producing harmonics signals at integral multiples of its fundamental operating frequency. A first band-pass filter 32 separates a selected one of these harmonics both from the fundamental and from the remaining harmonics, the selected harmonic appearing on conductor 34. A second band-pass filter 33 is tuned to pass another, different harmonic signal which appears on conductor 35.

Conductors 15, 25, 34 and 35 are connected to the four fixed contacts of a double-pole, double-throw switch indicated generally at 39. The two moving contacts on switch 39 are respectively connected to the two inputs of a "mixer" or intermodulating circuit 40.

With switch 39 in the position shown in FIG. 1, mixer 40 intermodulates one harmonic from oscillator 30 with the transmitted carrier signal, producing a low-frequency difference signal which is passed to a frequency monitor 45. The frequency monitor may take any one of a number of well known forms (e.g., a digital frequency meter clocked by a low frequency reference signal, a resonant reed monitor, a frequency discriminator employing a resonant circuit tuned slightly "off-frequency" from the heterodyne product, and the like).

When switch 39 is moved to its upper position, the mixer 40 intermodulates the primary reference signal appearing on conductor 115 with the other harmonic signal from local oscillator 30. In this position, the monitor 45 provides an accurate comparison between the primary frequency standard signal and the secondary reference signal produced by local oscillator 30.

In order to permit monitor 45 to conveniently monitor both heterodyne products, it is desirable that the fundamental frequency produced by local oscillator 30 be selected such that these two heterodyne products have the same frequency. By way of example, assume that the assigned carrier frequency of a broadcast station to be monitored is 920 kilohertz. By selecting the local oscillator fundamental frequency of 102 kilohertz, the ninth oscillator harmonic appears at 918 kilohertz (2 kilohertz below the assigned transmitting frequency) and the 49th oscillator harmonic appears at 4998 kilohertz (2 kilohertz below the 5 megahertz signal transmitted by WWV and WWVH). Thus, in both cases, the difference frequency signal produced by mixer 40 appears at 2 kilohertz and both of these difference frequency signals may be monitored by a single, fixed-tuned monitor 45.

The selection of a local oscillator frequency having the appropriate harmonics may be accomplished in a variety of ways. A convenient graphical solution may be achieved by plotting the absolute value of the difference between the transmitting frequency and a series of selected harmonics over a limited range of possible oscillator frequencies. Next, the absolute value of the difference between the primary reference frequency and the appropriate series of adjacent harmonics of the oscillator frequency are plotted. Equal difference frequencies are indicated by the intersections between the two families of plotted values.

FIG. 2 of the drawings illustrates a more elaborate frequency determination system which embodies the principles of the invention. The transmission from a primary frequency standard station is picked up by an antenna 50 and amplified by a pre-amplifier 52. A band-pass filter 53 suppresses signals on nearby frequencies.

The system depicted in FIG. 2 employs means for removing the side-band frequency components from the received reference carrier. The modulated carrier from band-pass filter 53 is applied to the input of a mixer 54, the other input of which is connected to the output of a local oscillator 55. The combination of oscillator 55 and mixer 54 translates the reference signal to a lower frequency, this lower frequency being passed through a "notch" filter 60 which removes the sideband frequency components and noise from the modulated carrier. This low frequency carrier is then translated upwardly to its original frequency by means of a mixer 62, one input of which is connected to the output of the sideband filter 60 and the other input of which is connected to the output of the local oscillator 55.

It is important to note that the local oscillator 55 need not be perfectly stable. Its frequency is first subtracted from the reference frequency in mixer 54 but is again added at mixer 62. Thus, the frequency of the carrier at the output of mixer 62 is exactly the same as the frequency applied to the input of mixer 54. A filter 65 is employed to eliminate any other intermodulation products produced at the output of mixer 62 such that a pure, unmodulated primary reference signal is applied via conductor 68 to one input of mixer 70. The other input of mixer 70 receives a selected harmonic signal from crystal oscillator 72. This harmonic is isolated from the remaining harmonics (and the fundamental) produced by oscillator 72 by means of a harmonic filter 74. Mixer 70 thus produces an intermodulation product having a frequency equal to the difference between the reference carrier frequency and a nearby harmonic of the local oscillator frequency.

The resulting low frequency signal appears at the output of mixer 70, is separated from any remaining intermodulation products by low-pass filter 74 and is passed to the input of a frequency discriminator 78.

Frequency discriminator 78, which may take any one of several well known forms, is adapted to produce an output signal whose magnitude is related to the deviation of the applied input signal from a predetermined frequency. This output signal from frequency discriminator 78 is applied to a servomechanism 80 which appropriately adjusts a trimming capacitor indicated at 82 (or some other appropriate vernier tuning device). The capacitor 82, being adjusted by servomechanism 80, holds the operating frequency of oscillator 72 at a constant value. Should oscillator 72 exhibit any tendency to drift in frequency, the frequency at the output of mixer 70 changes to energize servomechanism 80 to produce a compensating adjustment of trimmer capacitor 82.

A different harmonic of the fundamental signal produced by crystal oscillator 72 passes through harmonic filter 91 to an input of mixer 83. The other input signal to mixer 83 is supplied from the output of a crystal oscillator 90 and is passed through a noise and harmonic suppression filter 92 and a buffer-amplifier 93. The output of mixer 83 is passed through a low-pass filter 94 (which eliminates the undesired modulation products). The output of low-pass filter 94 is connected to the input of a frequency discriminator 95 which produces a control signal which is in turn applied to the input of a servomechanism 98. The servomechanism 98 adjusts a trimming capacitor indicated generally at 99 to hold the frequency of crystal oscillator 90 at a constant value. Since the signal applied to the input of mixer 83 (via harmonic filter 91 from crystal oscillator 72) has a constant frequency, any drift in frequency by oscillator 90 is manifested as a change in the frequency of the output signal from mixer 83. Servomechanism 98 therefore is capable of making a compensating adjustment to trimming capacitor 99 to hold the operating frequency of oscillator 90 at a constant value. The output of oscillator 90 is employed to produce the desired constant frequency carrier signal which is amplified by the final power amplifier 100 whose output is connected to the transmitting antenna 101. As may readily be appreciated, the frequency of the transmitted signal is thus automatically maintained at a frequency which is precisely referenced to the received primary frequency standard signal.

It is to be understood that the embodiments which have been described are merely illustrative of applications of principles of the invention. Numerous modifications may be made to these illustrative embodiments without departing from the true spirit and scope of the invention.

What is claimed is:

1. An improved arrangement for continually monitoring the operating carrier frequency of a radio transmitter comprising, in combination, means for receiving a radio signal having a first known carrier frequency, a local oscillator for generating a series of reference signals at a preselected second frequency and harmonics thereof, means coupled to said receiving means and to said local oscillator for intermodulating said first known carrier frequency and the frequency of one of said harmonics to produce a first monitoring difference signal substantially equal to a predetermined frequency, means connected to said local oscillator and to said radio transmitter for intermodulating said operating carrier frequency and the frequency of another of said harmonics to produce a second monitoring difference signal substantially equal to said predetermined frequency, and a single monitoring means responsive to said predetermined frequency for detecting variations in frequency of both said first and second monitoring difference signals whereby variations in said operating carrier frequency may be detected.

2. An improved arrangement as set forth in claim 1 wherein said means for receiving a radio signal includes means for removing the modulation from said radio signal to eliminate frequencies other than said carrier frequency.

3. An improved arrangement for continuously monitoring the operating carrier frequency of a radio transmitter comprising, in combination,
   a source of a reference signal having a first frequency,
   a local oscillator for producing an output signal at a preselected second frequency and harmonics signals at integral multiples of said second frequency,
   a first band-pass filter connected to said oscillator for isolating that one harmonic signal having a frequency nearest said first frequency,
   a second band-pass filter connected to said local oscillator for isolating that other harmonic signal having a frequency nearest said operating carrier frequency,
   means for intermodulating said reference signal and said one harmonic signal to produce a first heterodyne signal substantially equal to a predetermined frequency,
   means for intermodulating the signal from said transmitter and said other harmonic signal to produce a second heterodyne signal substantially equal to said predetermined frequency,
   a single monitoring means responsive to said predetermined frequency for detecting variations in the frequency of said first heterodyne signal and for detecting variations in the frequency of said second heterodyne signal such that the frequency drifting of said radio transmitter is accurately indicated.

4. An improved arrangement as set forth in claim 3 wherein said source of a reference signal comprises a radio frequency receiver tuned to receive a frequency standard signal broadcast from a remote location.

5. The improved arrangement as set forth in claim 3 wherein said first frequency is substantially higher than the operating carrier frequency of said transmitter.

6. An improved arrangement for continually monitoring the operating carrier frequency of a radio transmitter comprising, in combination,
   means for receiving a radio signal having a first known carrier frequency,
   a local oscillator for generating a series of reference signals at a preselected second frequency and harmonics thereof,
   a single mixing means for generating monitoring signals,
   switching means connected to the input of said mixing means for alternately conducting either said first known carrier frequency and the frequency of one of said harmonics to said mixing means such that said mixing means generates a first monitoring signal substantially equal to a predetermined frequency or for conducting said operating carrier frequency and the frequency of another of said harmonics to said mixing means such that said mixing means generates a second monitoring signal substantially equal to said predetermined frequency, and
   a single monitoring means connected to the output of said mixing means responsive to said predetermined frequency for continuously and accurately detecting variations in frequency of both said first and said second monitoring signals whereby variations in said operating carrier frequency may be accurately detected.

References Cited

UNITED STATES PATENTS

| | | | |
|---|---|---|---|
| 2,507,317 | 5/1950 | Moore | 331—31 |
| 2,763,836 | 9/1956 | Bullock | 324—79 |
| 2,860,246 | 11/1958 | Jakubowics | 331—31 |
| 3,032,650 | 5/1962 | Mathison et al. | 331—30 |
| 3,365,676 | 1/1968 | Buss | 331—18 |

ROBERT L. GRIFFIN, Primary Examiner

J. A. BRODSKY, Assistant Examiner

U.S. Cl. X.R.

325—67, 177, 184; 331—30, 31; 324—79